(12) United States Patent
Moreno

(10) Patent No.: US 11,892,861 B2
(45) Date of Patent: Feb. 6, 2024

(54) AUTONOMOUS FLOW CONTROL DEVICE WITH PILOT AMPLIFIED OPERATIONS, METHOD, AND SYSTEM

(71) Applicant: Oscar Becerra Moreno, Houston, TX (US)

(72) Inventor: Oscar Becerra Moreno, Houston, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 17/506,202

(22) Filed: Oct. 20, 2021

(65) Prior Publication Data

US 2023/0121280 A1 Apr. 20, 2023

(51) Int. Cl.
*G05D 7/01* (2006.01)
*E21B 34/08* (2006.01)
*E21B 43/12* (2006.01)

(52) U.S. Cl.
CPC .......... *G05D 7/0193* (2013.01); *E21B 34/08* (2013.01); *E21B 43/12* (2013.01); *G05D 7/0146* (2013.01)

(58) Field of Classification Search
CPC .................................. E21B 34/08; E21B 43/12
See application file for complete search history.

(56) References Cited

U.S. PATENT DOCUMENTS

| | | | | |
|---|---|---|---|---|
| 3,943,957 | A * | 3/1976 | Hayner | F15B 13/16 |
| | | | | 137/625.63 |
| 4,719,942 | A * | 1/1988 | Hayner | F15B 13/0438 |
| | | | | 137/625.61 |
| 5,586,084 | A | 12/1996 | Barron et al. | |
| 2002/0189815 | A1 | 12/2002 | Johnson et al. | |
| 2003/0043694 | A1 | 3/2003 | Collette | |
| 2015/0060084 | A1 | 3/2015 | Moen et al. | |
| 2017/0089173 | A1 * | 3/2017 | Zhao | E21B 47/06 |
| 2021/0002978 | A1 * | 1/2021 | Killie | E21B 34/08 |

FOREIGN PATENT DOCUMENTS

WO 2013028335 A2 2/2013

OTHER PUBLICATIONS

Oxford Languages. (2023). Composition. In Oxford Languages, provided via Google. (Year: 2023).*
Notification of Transmittal of the International Search Report and Written Opinion; PCT/US2022/078212; Korean Intellectual Patent Office; dated Jan. 26, 2023; 10 pages.

* cited by examiner

*Primary Examiner* — Robert E Fuller
(74) *Attorney, Agent, or Firm* — CANTOR COLBURN LLP

(57) ABSTRACT

An autonomous flow control device with pilot amplification includes a primary valve responsive to changes in fluid composition, and a pilot valve responsive to and more sensitive to changes in fluid composition than the primary valve and configured to aid change in position of the primary valve in the event of a change in fluid composition.

16 Claims, 5 Drawing Sheets

AUTONOMOUS FLOW CONTROL DEVICE WITH PILOT AMPLIFIED OPERATIONS, METHOD, AND SYSTEM

BACKGROUND

In the resource recovery and fluid sequestration industries, it is often necessary to manage fluid flows. It is particularly useful to be able to manage flows of different fluids automatically to enhance the overall operation. Drawbacks in the industry leave room for improvement and varying operating conditions render certain constructions superior to others for specific circumstances. Hence, the art is always receptive to new configurations.

SUMMARY

An autonomous flow control device with pilot amplification includes a primary valve responsive to changes in fluid composition, and a pilot valve responsive to and more sensitive to changes in fluid composition than the primary valve and configured to aid change in position of the primary valve in the event of a change in fluid composition.

A wellbore tool including a housing, a filter disposed at the housing to allow filtered fluid to pass within the housing, a primary valve in the housing and responsive to the fluid, and a pilot valve in the housing, the pilot valve responsive to and more sensitive to changes in a composition of the fluid than the primary valve and configured to aid change in position of the primary valve in the event of a change in fluid composition.

A method for controlling flow includes flowing a fluid from a source to a destination through a device with pilot amplification including a primary valve responsive to changes in fluid composition, and a pilot valve responsive to and more sensitive to changes in fluid composition than the primary valve and configured to aid change in position of the primary valve in the event of a change in fluid composition, and assisting the primary valve to a different position with pressure change caused by the pilot valve changing to a different position.

A wellbore system includes a borehole in a subsurface formation, a string disposed in the borehole, and a device with pilot amplification including a primary valve responsive to changes in fluid composition, and a pilot valve responsive to and more sensitive to changes in fluid composition than the primary valve and configured to aid change in position of the primary valve in the event of a change in fluid composition, disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
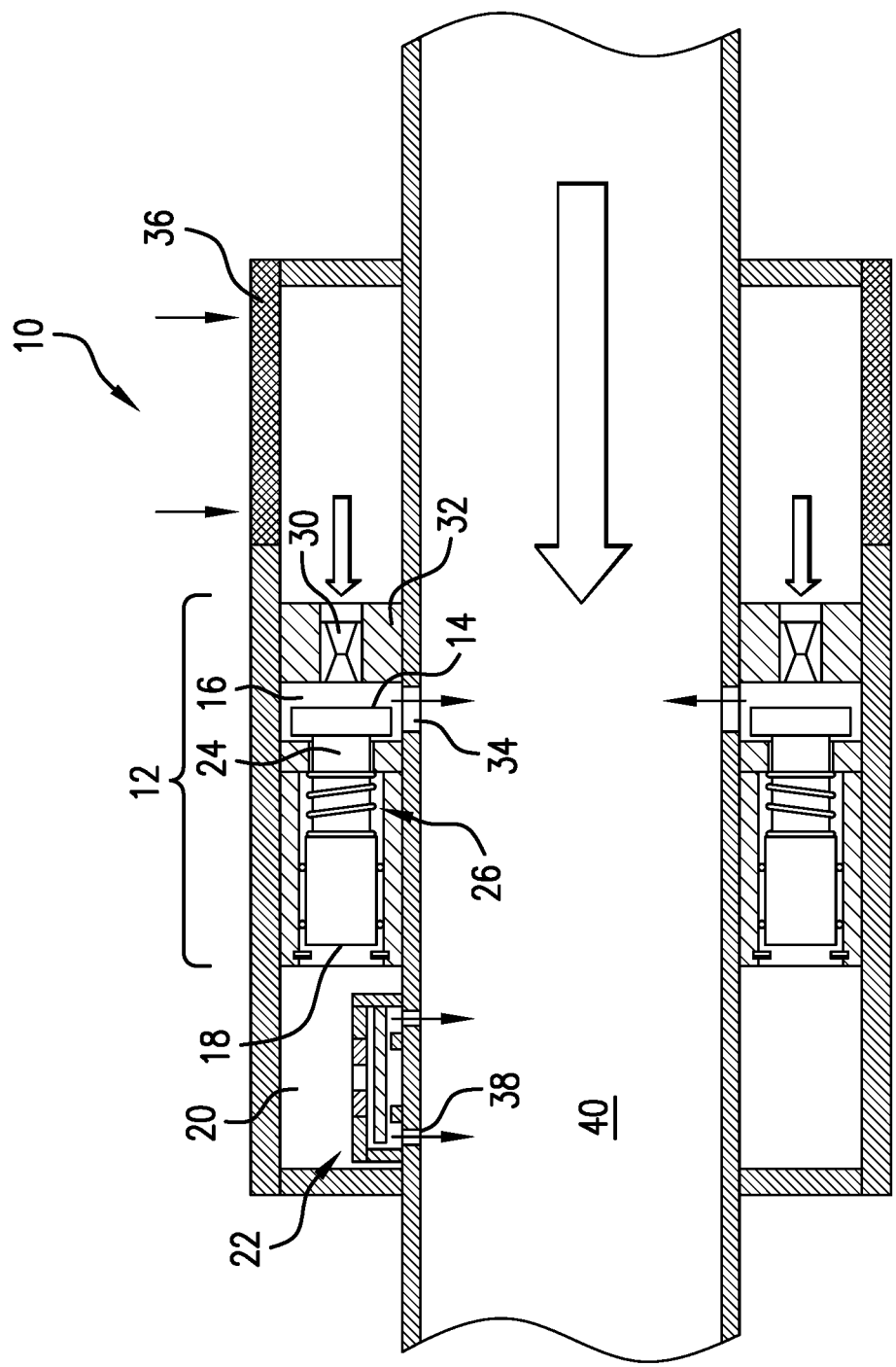
FIG. 1 is a cross sectional view of a first embodiment of an autonomous flow control device with pilot amplification as disclosed herein.
Figure 2:
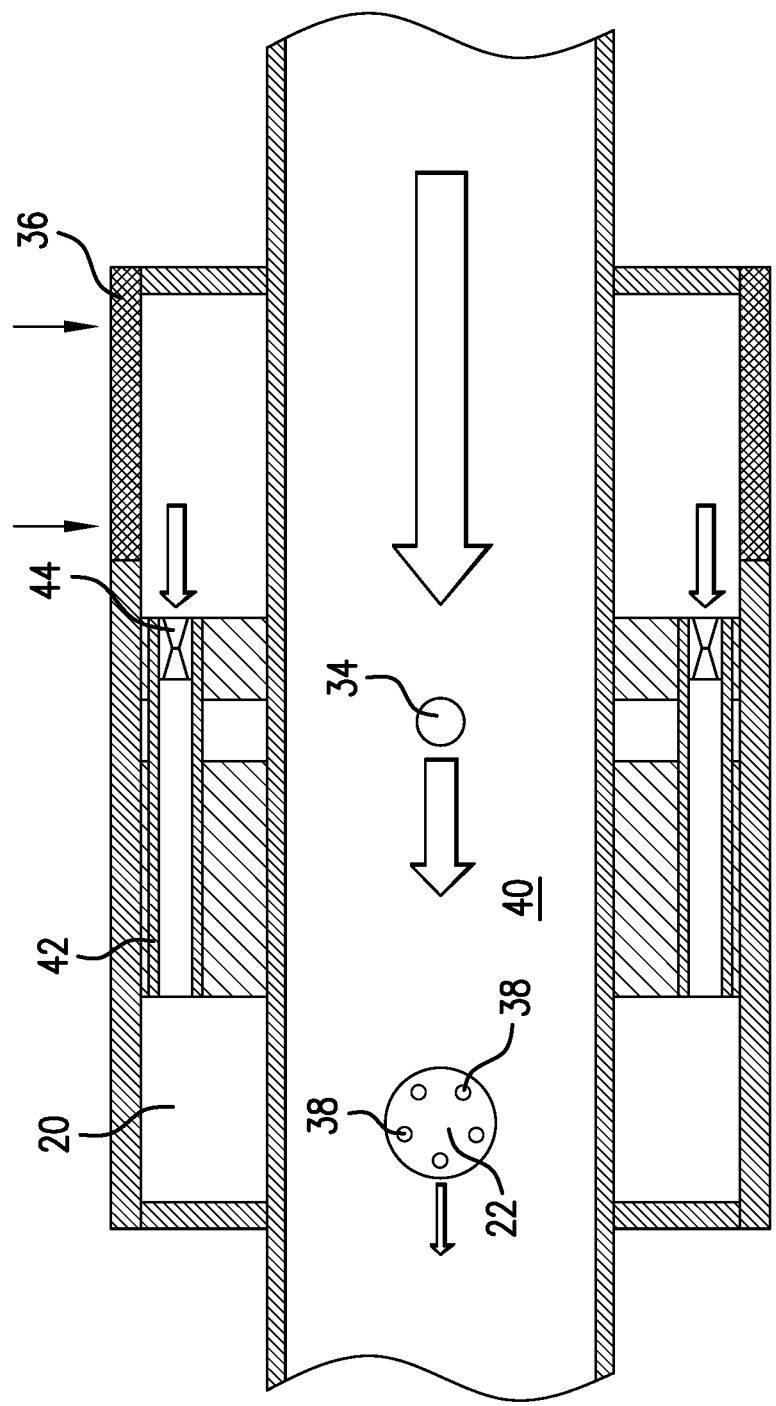
FIG. 2 is the same device as illustrated in FIG. 1 but rotated 90 degrees along a longitudinal axis of the device.
Figure 3:
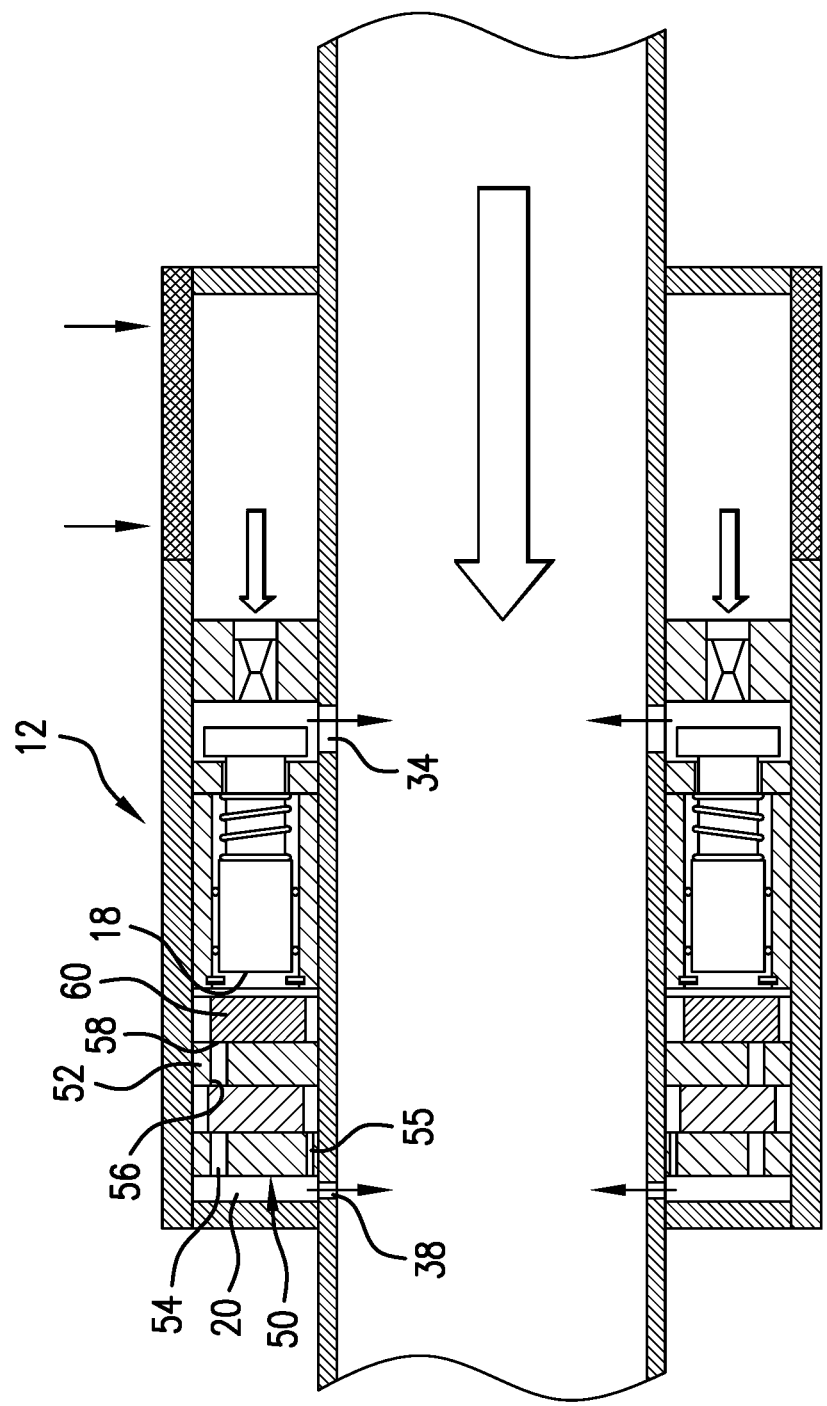
FIG. 3 is a cross sectional view of an alternate embodiment of an autonomous flow control device with pilot amplification as disclosed herein.
Figure 4:
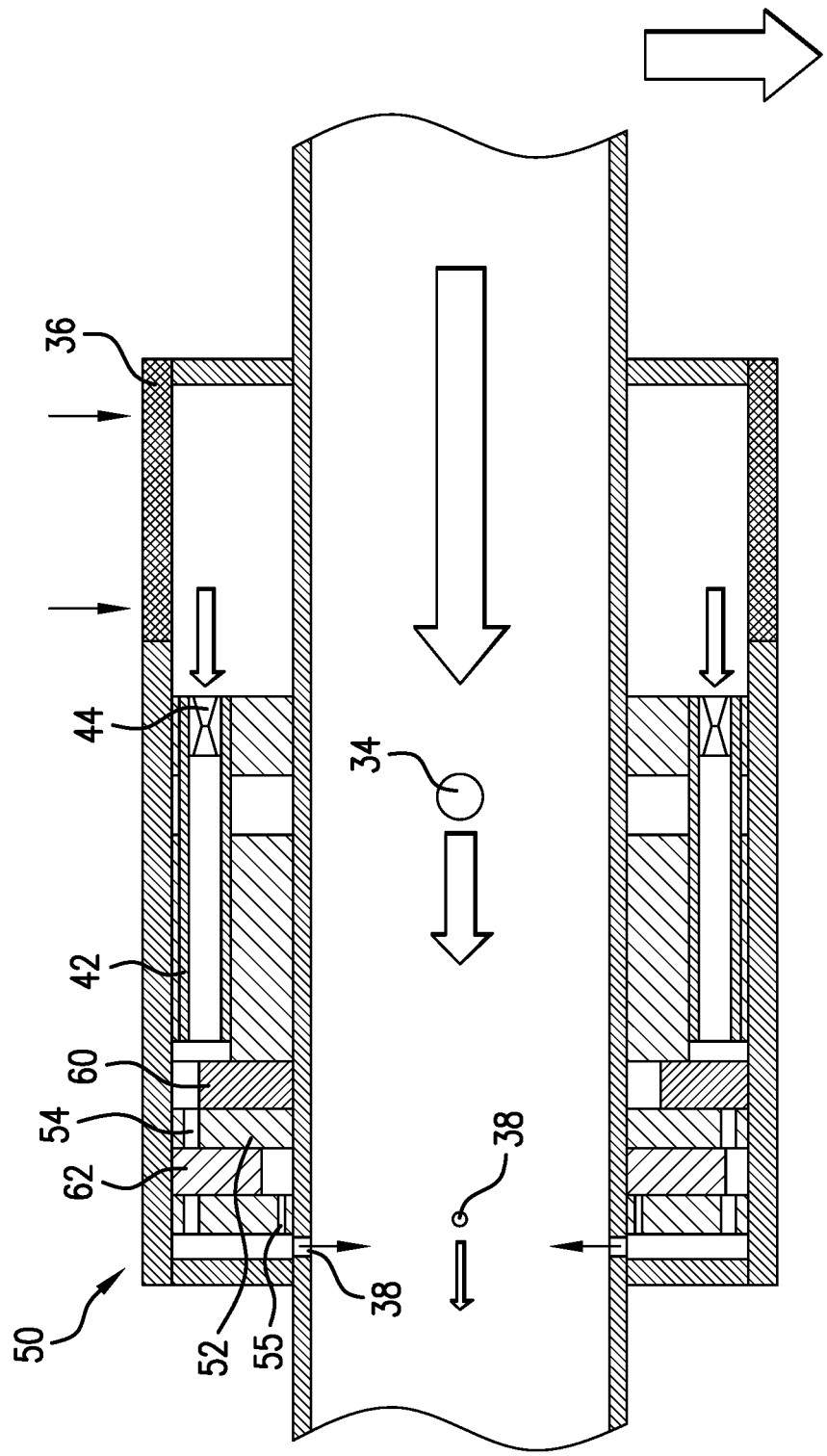
FIG. 4 is the same device as illustrated in FIG. 3 but rotated 90 degrees along a longitudinal axis of the device.

To appreciate the construction of the embodiments of device disclosed herein, it is important to review FIGS. 1 and 2 simultaneously and for another embodiment to review FIGS. 3 and 4 simultaneously. This is because each set (1, 2 and 3, 4) illustrate an embodiment in two different axial rotations. More specifically FIGS. 1 and 3 provide first axial cross-sectional views and then FIGS. 2 and 4 rotate the device about the respective longitudinal axes to provide another cross-sectional view 90 degrees from the first view, respectively.

Referring to FIGS. 1 and 2, a first embodiment of an autonomous flow control device with pilot amplification 10 is illustrated. The device 10 includes a primary valve 12 having one end 14 exposed to a first chamber 16 and a second end 18 exposed to a second chamber 20. The primary valve moves between closed and open positions based upon differential pressure experienced by the primary valve across the two ends 14 and 18. A pilot valve 22 is disposed in fluid pressure contact with the second chamber 20 and configured to respond more quickly to a change in fluid composition than the primary valve does. Upon a change in the pilot valve 22, assistance is given thereby to the primary valve 12 to change its position. This occurs either to close down flow or to open up flow depending upon what type of fluid is in the vicinity of the device 10. Since the composition of fluid can change over time, it is important that the device function both to autonomously close fluid flow and to autonomously open fluid flow. Because the pilot valve 22 is a part of the device 10, the primary valve may be larger than it otherwise could be thereby allowing a greater volume of fluid to be movable through that valve 12. This is beneficial in that a large production rate or a large injection rate is possible while still providing for rapid autonomous changes in response to density or viscosity changes in the ambient fluid of the device 10.

In embodiments, the pilot valve 22 reacts to certain parameters of the fluid to which it is exposed and in some cases to fluid that flows through the pilot valve 22 such as in FIG. 1. When an undesirable fluid change occurs, the pilot valve 22 reacts to close off fluid flow therethrough which results in a pressure increase in the second chamber 20. Since end 18 of the primary valve 12 is exposed to second chamber 20, the rising pressure of chamber 20 acts to urge the primary valve to a position that closes off fluid flow therethrough. The converse is also true. If the pilot valve 22 flows more freely due to a change in the composition of fluid in the vicinity of device 10, then the pressure in the second chamber 20 decreases and reduces the force on end 18, thereby allowing or even encouraging the movement of the primary valve 12 to the open position. The above general description is the same for both illustrated embodiments.

In the embodiment of FIGS. 1 and 2, the primary valve 12 includes a poppet 24 having an optional biasing member 26 configured to bias the poppet 24 to an open position. Seals 28 are disposed on the poppet 24 to provide for differential pressure across the poppet 24. Valve 12 further includes a restricted nozzle 30 defined by a housing member 32 that tends to pass desirable fluids while restricting undesirable fluids due to a converging diverging geometry as is understood in the art. To the extent poppet 24 is positioned out of the fluid pathway from nozzle 30 to a port 34, fluid will flow at a relatively high rate. In embodiments, a filter 36 may be employed as well. In FIGS. 1 and 2, the illustration is of an inflow control device and the filter is a sand screen but it is to be understood that the system could be reversed and used for a fluid sequestration system as well.

With regard to pilot valve 22, in the FIG. 1 embodiment, the valve is configured as a hydrodynamic disk valve. Undesirable changes in fluid composition cause the valve 22 to move to a more restrictive position thereby increasing pressure inside chamber 20 and closing valve 12. The operation of such a valve is \veil known to the art. As illustrated, the device is configured for production of a resource fluid and so the valve 22 will produce fluid unrestricted if the fluid is desirable and if the fluid composition becomes undesirable it will present a significant restriction to that fluid. The fluid will move through orifices 38 of valve 22 to a tubing inside diameter 40 as does the fluid moving through port 34.

How fluid gets to second chamber 20 and the pilot valve 22 is illustrated in FIG. 2. It will be appreciated from this view that the housing 32 not only defines nozzle 30 and supports poppet 24 but it also defines a bypass tube 42 having its own nozzle 44. The tube 42 connects the fluid moving through the filter 36 directly to the second chamber 20. For orientation of the Figure, note port 34 and orifices 38 relative to their positions in FIG. 1.

Referring to FIGS. 3 and 4, another embodiment of the device numbered 11 for distinction is illustrated. It will be appreciated that many components are the same as in FIGS. 1 and 2 and hence these are not revisited. What is distinct is the pilot valve. Pilot valve 50 differs from pilot valve 22 in that it is particularly suited for use in highly deviated or horizontal applications because it employs a specific gravity of a member relative to the specific gravity of fluids it is anticipated to encounter. The pilot valve 50 includes a housing 52 having a flow port 54 and flow port 55 therein. The flow port 54 is, in an embodiment, longitudinally oriented. In each embodiment, the port 54 is possessed of a first end 56 and a second end 58. A first gate 60 is disposed in the housing 52 adjacent the first end 58 of the port 54. The gate 60 is located in proximity to end 58 such that depending upon orthogonal position of the gate 60 relative to the housing 52, the gate will present an impediment to flow through the port 54. First gate 60 is, in the illustrated embodiment, shaped as a ring though the shape could be easily adapted. The first gate 60 comprises a material having a specific gravity that is lower than drilling mud intended for use in a specific well in which this flow control device 11 is intended for use and higher than that of water. Accordingly, the gate 60 will sink in water but float drilling fluid, for example. It is to be appreciated however that the specific gravity of the oil could be ignored in embodiments, leaving gate 60 configured to react to drilling fluid. In embodiments, both specific gravities are contemplated. These are generally known from logging operations during drilling of the well. The second gate 62 of a specific gravity slightly less than water and higher than oil, oil will be produced through the pilot valve 50 but if water breaks through, the pilot valve 50 will close and hence increase the pressure in chamber 20 as discussed in the embodiment of FIG. 1 with similar consequences. Materials for the gate 60 include metal, composites, etc.

When the device 11 is in a highly deviated or horizontal, the gate 60 will assume the positions as illustrated in FIG. 3 or 4 once the drilling mud is displaced depending upon the specific gravity of fluid surrounding gate 60 at the time.

In addition to first gate 60, the pilot valve 50 also includes a second gate 62 disposed within the housing. The second gate 62 is located in proximity to end 56 of port 54 (the opposite end from end 58) such that depending upon orthogonal position of the gate 62 relative to the housing 52, the gate will present an impediment to flow through the port 54 at end 56. Accordingly, in some positions, both gates 60 and 62 will simultaneously present impediment to fluid flow through port 54. Second gate 62 is configured with a specific gravity of slightly lower than the water that is already in the formation in which the device is to be used (known from logging as noted above). For clarity, "slightly lower" means any amount lower since if the specific gravity is lower than the water in situ, the ring will float. If the difference in specific gravity is small, floating will occur slower, if the difference is greater, floating will occur more quickly. Hence, determination of how much difference there is in specific gravity depends upon other factors such as how fast one wants the second gate 62 to react to water and shut off. Overall, this gate works similarly to gate 60. When it floats on the fluid flowing through the device 11, that flow is inhibited. When it sinks, flow is better enabled through port 54 at the high side of the device 11. In an embodiment, illustrated in FIG. 4, the first gate 60 has sunk relative to ambient fluid and the second gate 62 has floated relative to the same ambient fluid and both port 54 and port 55 are impeded. If this is, for example, a hydrocarbon production configuration, it is water that causes the gates 60 and 62 to assume the illustrated positions and thereby cause pressure in chamber 20 to rise thereby loading the end 18 of poppet 24 to help close the primary valve 12.

Figure 5:
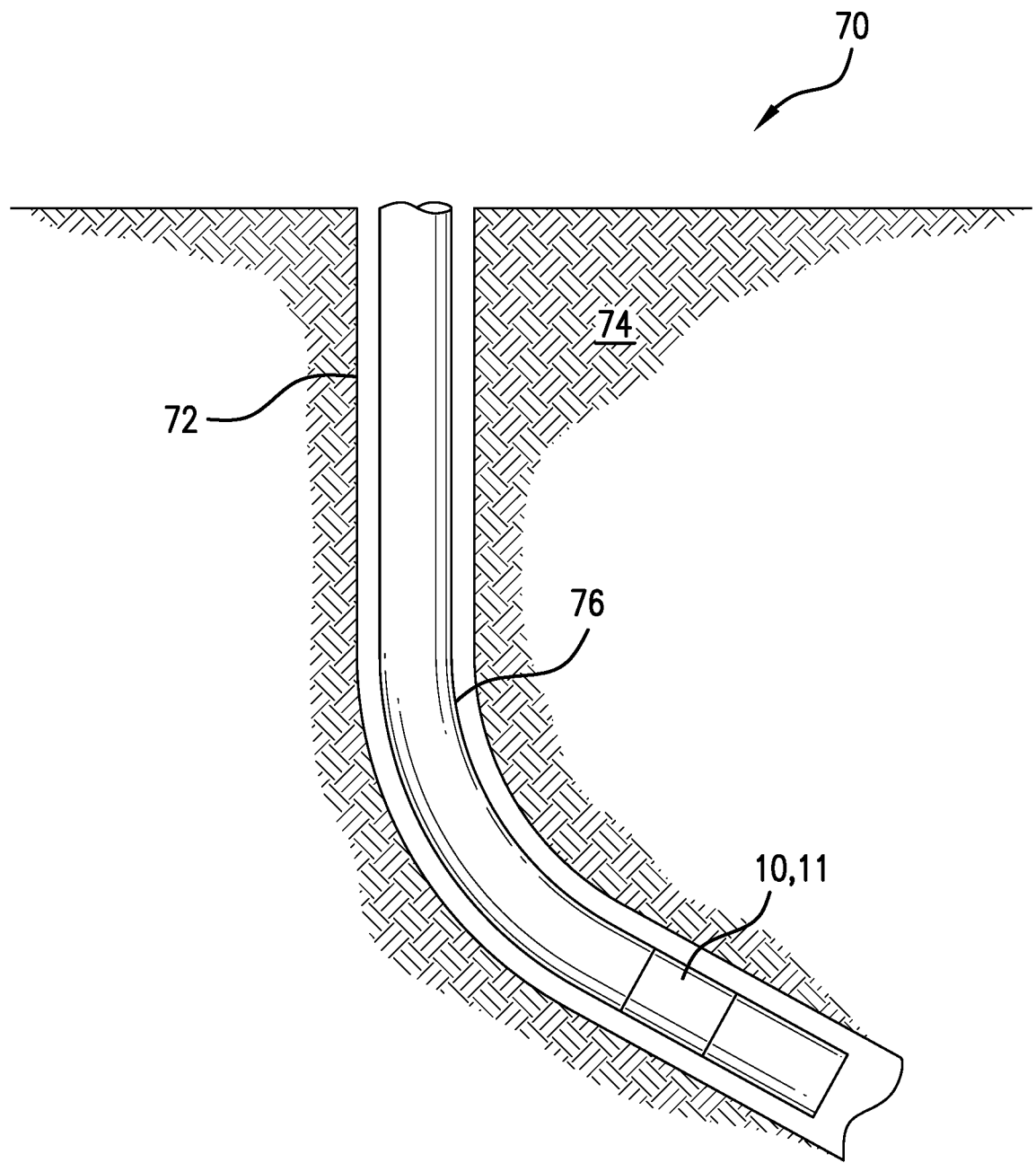
FIG. 5 is a schematic view of a wellbore system including the autonomous flow control device with pilot amplification disclosed herein.

Referring to FIG. 5 a wellbore system 70 is illustrated. Wellbore system 70 includes a borehole 72 in a subsurface formation 74. Disposed within the borehole 72 is a string 76. Disposed within or as a part of the string is a device 10, 11 as disclosed herein. The system may be a hydrocarbon recovery system or may be a fluid sequestration system depending upon in which direction the various components are oriented.

Set forth below are some embodiments of the foregoing disclosure:

Embodiment 1: An autonomous flow control device with pilot amplification includes a primary valve responsive to changes in fluid composition, and a pilot valve responsive to and more sensitive to changes in fluid composition than the primary valve and configured to aid change in position of the primary valve in the event of a change in fluid composition.

Embodiment 2: The autonomous flow control device as in any prior embodiment further comprising a first chamber and a second chamber, the primary valve being exposed at one operational end thereof to the first chamber and at an opposite operational end to the second chamber, the primary valve responsive to pressure differential between the first and second chambers.

Embodiment 3: The autonomous flow control device as in any prior embodiment wherein the pilot valve is disposed in fluid contact with the second chamber.

Embodiment 4: The autonomous flow control device as in any prior embodiment wherein the pilot valve is disposed in the second chamber.

Embodiment 5: The autonomous flow control device as in any prior embodiment wherein pressure in the second chamber rises when the pilot valve changes from a more open position to a more closed position, during use.

Embodiment 6: The autonomous flow control device as in any prior embodiment wherein a rising pressure in the second chamber causes the primary valve to move toward a closed position, during use.

Embodiment 7: The autonomous flow control device as in any prior embodiment wherein the primary valve is a poppet valve.

Embodiment 8: The autonomous flow control device as in any prior embodiment wherein the pilot valve is a hydrodynamic disk valve.

Embodiment 9: The autonomous flow control device as in any prior embodiment wherein the pilot valve comprises a member having a specific gravity selected to have a specific floating or sinking action relative to anticipated fluids in the device during use.

Embodiment 10: The autonomous flow control device as in any prior embodiment wherein the pilot valve further includes an orifice that is blocked or opened depending upon whether the member is floating in or sinking in the anticipated fluid.

Embodiment 11: A wellbore tool including a housing, a filter disposed at the housing to allow filtered fluid to pass within the housing, a primary valve in the housing and responsive to the fluid, and a pilot valve in the housing, the pilot valve responsive to and more sensitive to changes in a composition of the fluid than the primary valve and configured to aid change in position of the primary valve in the event of a change in fluid composition.

Embodiment 12: A method for controlling flow includes flowing a fluid from a source to a destination through a device as in any prior embodiment, and assisting the primary valve to a different position with pressure change caused by the pilot valve changing to a different position.

Embodiment 13: The method as in any prior embodiment, wherein the position change of the primary valve is to a more closed position based upon pressure rise caused by the change in position of the pilot valve to a more closed position.

Embodiment 14: The method as in any prior embodiment wherein the position change of the primary valve is to a more open position based upon pressure fall caused by the change in position of the pilot valve to a more open position.

Embodiment 15: The method as in any prior embodiment wherein the changing of position of the pilot valve is by reacting to a viscosity of fluid in contact with the pilot valve.

Embodiment 16: The method as in any prior embodiment wherein the changing of position of the pilot valve is by reacting to a specific gravity of fluid in contact with the pilot valve.

Embodiment 17: A wellbore system includes a borehole in a subsurface formation, a string disposed in the borehole, and a device as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An autonomous flow control device with pilot amplification comprising:
   a pilot valve having a moving member and responsive to fluid density or viscosity;
   a primary valve configured to change in position in response to a change of position of the pilot valve; and
   a first chamber and a second chamber, the primary valve being exposed at one operational end thereof to the first chamber and at an opposite operational end to the second chamber, the primary valve responsive to pressure differential between the first and second chambers, wherein pressure in the second chamber rises when the pilot valve changes from a more open position to a more closed position, during use.

2. The device as claimed in claim 1 wherein the pilot valve is disposed in fluid contact with the second chamber.

3. The device as claimed in claim 1 wherein the pilot valve is disposed in the second chamber.

4. The device as claimed in claim 1 wherein a rising pressure in the second chamber causes the primary valve to move toward a closed position, during use.

5. The device as claimed in claim 1 wherein the primary valve is a poppet valve.

6. The device as claimed in claim 1 wherein the pilot valve is a hydrodynamic disk valve.

7. The device as claimed in claim 1 wherein the moving member comprises a specific gravity selected to have a specific floating or sinking action relative to anticipated fluids in the device during use.

8. The device as claimed in claim 7 wherein the pilot valve further includes an orifice that is blocked or opened depending upon whether the member is floating in or sinking in the anticipated fluid.

9. A method for controlling flow comprising:
   flowing a fluid from a source to a destination through a device as claimed in claim 1;
   assisting the primary valve to a different position with pressure change caused by the pilot valve changing to a different position.

10. The method as claimed in claim 9 wherein the position change of the primary valve is to a more closed position based upon pressure rise caused by the change in position of the pilot valve to a more closed position.

11. The method as claimed in claim 9 wherein the position change of the primary valve is to a more open position based upon pressure fall caused by the change in position of the pilot valve to a more open position.

12. The method as claimed in claim 9 wherein the changing of position of the pilot valve is by reacting to a viscosity of fluid in contact with the pilot valve.

13. The method as claimed in claim 9 wherein the changing of position of the pilot valve is by reacting to a specific gravity of fluid in contact with the pilot valve.

14. A wellbore system comprising:
   a borehole in a subsurface formation;
   a string disposed in the borehole;
   a device as claimed in claim 1 disposed within or as a part of the string.

15. A wellbore tool comprising:
   a housing;
   a filter disposed at the housing to allow filtered fluid to pass within the housing;
   a pilot valve in the housing having a moving member and responsive to fluid density or viscosity of the filtered fluid;
   a primary valve in the housing configured to change in position in response to a change of position of the pilot valve; and
   a first chamber and a second chamber, the primary valve being exposed at on operational end thereof to the first chamber and at an opposite operational end to the second chamber, the primary valve responsive to pressure differential between the first and second chambers, wherein pressure in the second chamber rises when the pilot valve changes from a more open position to a more closed position, during use.

16. An autonomous flow control device with pilot amplification comprising:
   a pilot valve having a moving member and responsive to fluid density or viscosity;
   a primary valve configured to change in position in response to a change of position of the pilot valve; and
   a first chamber and a second chamber, the primary valve being exposed at one operational end thereof to the first chamber and at an opposite operational end to the second chamber, the primary valve responsive to pressure differential between the first and second chambers, wherein a rising pressure in the second chamber causes the primary valve to move toward a closed position, during use.

* * * * *